(12) United States Patent
Mol et al.

(10) Patent No.: US 10,508,960 B2
(45) Date of Patent: Dec. 17, 2019

(54) LOAD DETERMINING SYSTEM FOR A ROLLING ELEMENT BEARING

(71) Applicant: AKTIEBOLAGET SKF, Göteborg (SE)

(72) Inventors: Hendrik Anne Mol, Sleeuwijk (NL); Simon van Ballegooij, Wijk bij Duurstede (NL); Jozef Maria Storken, Nieuwegein (NL)

(73) Assignee: Aktiebolaget SKF, Göteborg (SE)

( * ) Notice: Subject to any disclaimer, the term of this patent is extended or adjusted under 35 U.S.C. 154(b) by 132 days.

(21) Appl. No.: 15/106,345

(22) PCT Filed: Dec. 20, 2013

(86) PCT No.: PCT/EP2013/077840
§ 371 (c)(1),
(2) Date: Jun. 20, 2016

(87) PCT Pub. No.: WO2015/090479
PCT Pub. Date: Jun. 25, 2015

(65) Prior Publication Data
US 2016/0334290 A1    Nov. 17, 2016

(51) Int. Cl.
*G01L 1/10* (2006.01)
*G01L 5/00* (2006.01)
*G01L 5/12* (2006.01)

(52) U.S. Cl.
CPC ............ *G01L 5/0023* (2013.01); *G01L 5/12* (2013.01)

(58) Field of Classification Search
CPC ............ G01D 5/24438; G01D 5/2449; G01D 5/24452; G01D 5/2451; F16C 41/007;
(Continued)

(56) References Cited

U.S. PATENT DOCUMENTS

2008/0075399 A1* 3/2008 Shibasaki ............ F16C 19/522
                                                          384/448
2008/0095483 A1* 4/2008 Duret .................... F16C 19/522
                                                          384/448
(Continued)

FOREIGN PATENT DOCUMENTS

CN    1849516 A    10/2006
CN    101092994 A   12/2007
(Continued)

*Primary Examiner* — Brandi N Hopkins
(74) *Attorney, Agent, or Firm* — Bryan Peckjian; SKF USA Inc. Patent Dept.

(57) ABSTRACT

The invention provides a load determining system including a sensorized rolling element bearing in a hub unit for wheels. The bearing includes a first ring and a second ring as an inner ring and an outer ring. Either one of the first and second ring may be the inner ring, the other ring being the outer ring. The system includes at least one magnetic sensor attached to the first ring that interacts with a target wheel attached to the second ring. Further, the system includes a signal processing unit configured to receive the magnetic sensor output of the at least one magnetic sensor. The signal processing unit is configured to determine at least axial forces acting on the bearing based on the amplitude of the magnetic sensor output. It is proposed that a pitch wavelength of the target ring is 4 mm or less.

12 Claims, 4 Drawing Sheets

(58) Field of Classification Search
CPC .... F16C 19/186; F16C 33/723; F16C 19/522; F16C 19/386; F16C 2326/02; G01L 5/0023; G01L 5/0019; B60B 27/0068; B60B 27/0005; G01M 17/00; G01M 13/04; G01B 7/30; G01R 33/07; G01R 33/09

See application file for complete search history.

(56) References Cited

U.S. PATENT DOCUMENTS

| | | | |
|---|---|---|---|
| 2008/0243427 A1 | 10/2008 | Ono | |
| 2008/0273823 A1 | 11/2008 | Taniguchi et al. | |
| 2010/0172605 A1* | 7/2010 | Pausch | F16C 33/416 384/446 |
| 2010/0176799 A1* | 7/2010 | Ausserlechner | G01B 7/30 324/207.2 |
| 2011/0125421 A1* | 5/2011 | Takahashi | B60B 27/0005 702/42 |
| 2015/0260590 A1* | 9/2015 | Hatakeyama | F16C 41/00 384/448 |

FOREIGN PATENT DOCUMENTS

| | | |
|---|---|---|
| CN | 102128203 A | 7/2011 |
| CN | 102216630 A | 10/2011 |
| EP | 1130362 A2 | 9/2001 |
| EP | 1672372 A1 | 6/2006 |
| EP | 1130362 B1 | 8/2008 |
| FR | 2794504 A1 | 12/2000 |
| JP | 2005091073 A | 4/2005 |
| JP | 2008002620 A | 1/2008 |
| JP | 2008128812 A | 6/2008 |
| JP | 2008215977 A | 9/2008 |
| JP | 2010243378 A | 10/2010 |
| WO | 2010084002 A3 | 7/2010 |
| WO | 2011154016 A1 | 12/2011 |

* cited by examiner

LOAD DETERMINING SYSTEM FOR A ROLLING ELEMENT BEARING

CROSS-REFERENCE TO RELATED APPLICATIONS

This application is the U.S. national stage of International Application No. PCT/EP2013/077840 filed on Dec. 20, 2014, the contents of which are fully incorporated herein by reference.

FIELD OF THE INVENTION

The invention relates to a load determining system for a rolling element bearing and to a method for determining a load on a rolling element bearing.

BACKGROUND OF THE INVENTION

Rolling element bearings are precision made components the stiffness of which is predictable in more than one direction such that the movement of the inner ring of the bearing with respect to the outer ring is predictable as a function of load, temperature and light thermal parameters.

Methods employing non-contact sensors such as magnetic sensors are known in the prior art, e.g. disclosed in the document JP 2008-215977 A.

In this technology, a sensor system optimized for determining a wheel speed for ABS (Anti-lock Braking System) or slip control employing the frequency of the sensor signal is used to additionally determine the load acting on the bearing. For this purpose, the amplitude of the signal obtained by the magnetic sensor is read out. The amplitude of the magnetic field acting between a magnetic sensor and an angle target ring depends on the axial distance between these elements and is used to determine the relative axial position of the rings.

Commercially available hub units with sensor bearings are optimized for wheel speed detection and the period of the magnetically active pattern on or in the target ring about 8 mm or more. This period will also be referred to as the "wavelength" of the target ring in the following. For typical diameters of 270 mm or more, this pitch leads to a sufficient angular resolution while ensuring a sufficiently high signal-to-noise ratio and neatly detectable pulses. The relatively large wavelength ensures a good signal to noise ratio within the elastic movement of the bearing under any load, but does not allow an accurate sensing of the load as it varies relatively little with the displacement between the magnetic ring and the magnetic sensor. A shorter wavelength would allow an improved change with distance.

When using standard target wheels for load detection as disclosed e.g. in JP 2008-215977 A, the characteristic function describing the dependency of the signal amplitude on the distance has a fairly shallow slope such that the resolution in the distance detection is low. The reason for this is obvious: since standard sensor wheels are optimized for wheel speed detection, the signal should be unaffected by variations in the distance as far as possible.

On the other hand, the application PCT/EP2010/00345 discloses a method employing strain gauges attached to the inner ring or to the outer ring of the bearing in order to measure elastic deformations of the bearing. The local deformation is a measure of the load variation with respect to a baseline. However, the baseline depends on temperature and thermal gradients induced by friction heat such that it is normally impossible to derive absolute loads from absolute strains.

As a consequence, both methods are unsatisfactory. While the displacement sensor method is unable to account of effects of local strains or thermal expansions while the conventional method using strain gages has problems in determining absolute values for the load.

SUMMARY OF THE INVENTION

The invention proposes a solution to the above mentioned problems and starts from a load determining system including a sensorized rolling element bearing in a hub unit for wheels. The bearing includes a first ring and a second ring as an inner ring and an outer ring, wherein either one of the first and second ring may be the inner ring, the other ring being the outer ring. The system includes at least one magnetic sensor attached to the first ring so as to interact with a target wheel attached to the second ring. Further, the system includes a signal processing unit configured to receive the magnetic sensor output of the at least one magnetic sensor, wherein the signal processing unit is configured to determine at least axial forces acting on the bearing based on the amplitude of the magnetic sensor output.

It is proposed that a pitch wavelength of the target ring is 4 mm or less. The magnetic interaction with the target ring and the sensor decreases in a good approximation exponentially with increasing distance. The decay constant is a function of the characteristic length scales of the structures on the circumference of the target ring, i.e. in particular of the pitch wavelength or the period of the pattern. Under the presumption that the pitch wavelength is the only relevant length scale, it follows immediately from scaling arguments that the decay factor, i.e. the distance over which the amplitude decreases by 1/e (e: Euler's constant) is proportional to the pitch wavelength. The choice of the pitch wavelength according to the invention increases the sensitivity of the system such that the decay factor increases up to 2 $mm^{-1}$ or even above this value, whereas the decay constant in currently available ABS hubs is 1 $mm^{-1}$ or less. The former value corresponds to the minimum sensitivity needed for a reliable detection of bearing deformations caused by cornering forces in an automobile hub unit or truck hub unit.

The choice of the small pitch wavelength in a hub unit implementing not only load sensing but rather sensing of wheel speed for ABS control is non-obvious because the increased sensitivity to distance variations is contrary to the general aim to avoid this sensitivity in ABS hubs. The target rings in ABS hubs have typical diameters of 200-300 mm and widths of 10-20 mm and that the size (length in circumferential direction) of the sensor is between 1.5 mm and 3 mm or at least smaller than the pitch wavelength.

The invention is applicable to various kinds of rolling element bearing used in hub units for automobiles, trucks or trains, including double-row roller bearings, tapered roller bearings, toroidal roller bearings, ball bearings or the like.

In a further embodiment of the invention, it is proposed that the load determining system further includes at least one deformation sensor. The deformation sensor is adapted to be attached to an inner ring or to an outer ring of a bearing and the signal processing unit is configured to receive the deformation sensor output of the at least one deformation sensor. The deformation sensor may be formed as a standard strain gauge based on a patterned metallic foil, a semiconductor or piezoelectric strain gauge or a fiber Bragg grating (FBG) bonded to the inner ring or to the outer ring at least at one position, preferably at multiple positions homogeneously distributed over the circumference.

According to one aspect of the invention, the signal processing unit is further configured to receive the magnetic sensor output of the magnetic sensor and to calculate a bearing load as a function of the deformation sensor output and of a magnetic sensor output.

By using both kinds of sensor output, the invention is able to combine the advantages of both methods according to the prior art and to avoid their respective drawbacks as further described below.

By making use of the absolute distance measurement based on the magnetic sensor output, the method and the system are able to cancel the drift induced by friction heat but in addition provide a way to measure bearing loads and bearing systems with a number of elastic decrease of redeem which is insufficient to determine one or more load vectors. This happens in particular in double-row, compact wheel bearing units where two rolls of balls are in close proximity to each other. It is known that cornering loads lead to very similar strain patterns on the surface of the bearings for very different maneuvers and cannot be ordinarily determined using strain gages alone.

The target wheel is preferably used for measuring the angular position of the bearing. In the context of the invention, the target wheel may be any kind of wheel or gear magnetically interacting with the magnetic sensor so as to produce a sensor signal varying with the distance between the sensor and the wheel.

Preferably, the target wheel is arranged so as to face a sensing surface of the sensor with an axial gap. As a consequence, the distance and thus the sensor signal is a direct function of the axial displacement between the inner ring and the outer ring. However, it might be possible to use inclined sensing surfaces or sensing surfaces facing in a radial direction in other embodiments.

Preferably, the magnetic sensor is formed as a differential Hall sensor. A differential Hall sensor, preferably with back-magnet if used with a magnetically salient rotating ring, observes the special variation of the magnetic field due to the passage of the slotted magnetically permeable steel ring, target ring, disc or gear tooth or may be combined with a target ring containing a multitude of precisely produced north and south poles on its surface (a multi-pole magnetic ring with alternating magnetized regions similar to a Hallbach Array).

Further, it is preferred that the signal processing unit is configured to calculate a bearing load as a function of the amplitude of the magnetic sensor output. By restricting the signal processing to the amplitude, the processing it greatly simplified as compared to more complex solutions where more information, e.g. on the frequency spectrum is extracted from the signal.

Further, it is proposed that the signal processing unit is configured to process the sensor signals by removing a drift of the sensor signals caused by friction heat prior to calculating the average. The drift may be calculated in particular based on the deformation sensor signals.

A yet further aspect of the invention relates to a method implementing the load detection method as described above. In particular, the method includes the steps of receiving a magnetic sensor output of the at least one magnetic sensor and calculating the load as a function of the at least deformation sensor output. According to the invention, the method further comprises the step of calculating a bearing load as a function of the magnetic sensor output.

The above embodiments of the invention as well as the appended claims and figures show multiple characterizing features of the invention in specific combinations. The skilled person will easily be able to consider further combinations or sub-combinations of these features in order to adapt the invention as defined in the claims to his or her specific needs.

DETAILED DESCRIPTION OF THE EMBODIMENTS

Figure 1:
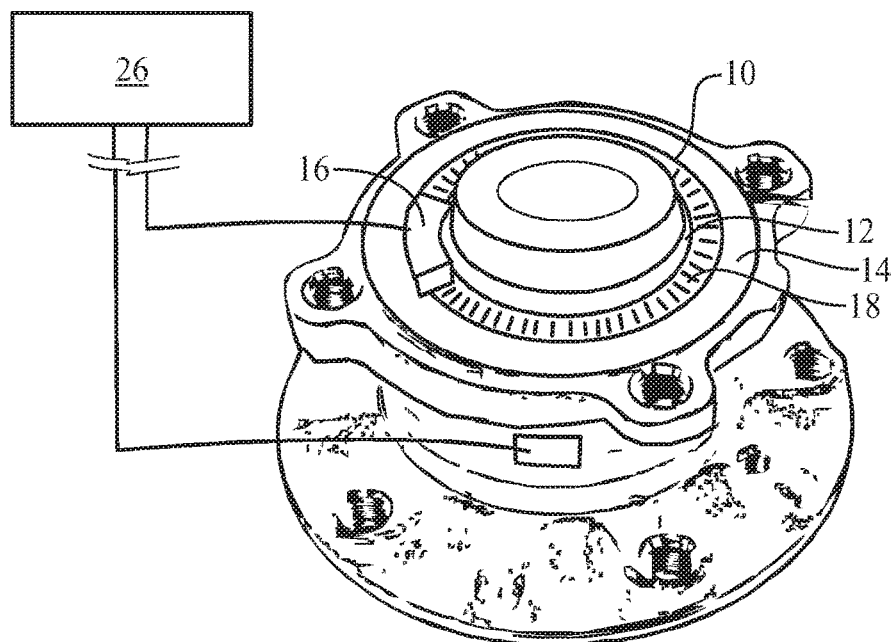
FIG. 1 is a schematic illustration of a load determining system used in a bearing integrated in an automobile hub unit.

FIG. 1 illustrates a hub unit of an automobile including a bearing 10 formed as a double row roller bearing. The bearing includes an inner ring 12 mounted on an axle and an outer ring 14. The hub unit is provided with integrated ABS (Anti-Lock Braking-System) and is provided with a target ring 18 formed as a slotted magnetically permeable steel ring and attached to the outer ring 14.

Figure 2:
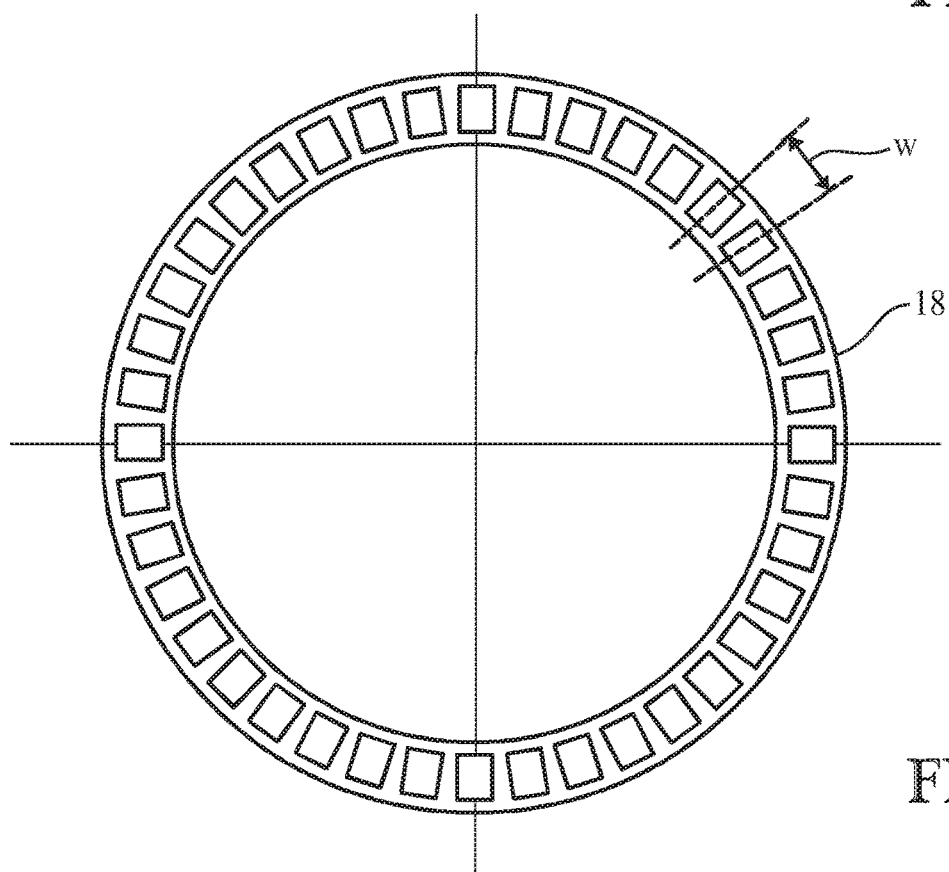
FIG. 2 is a target ring of the load determining system according to FIG. 1.

The target ring 18 is illustrated in FIG. 2 and is formed as a steel ring with slots 17 and radially extending partition fingers or bars 19 separating the slots 17. The distance of the slots 17 in a radial direction, i.e. the pitch w of the ring amounts to about 3 to 4 mm and is therefore smaller than the pitch of target rings used in standard ABS sensors wherein the period length is between 6 mm and 8 mm. Here and in the following, this period length will also be described as wavelength w. The pitch wavelength w may e.g. be measured along a curved section of a circle connecting the center points of the radially inner edges of the slots 17.

Figure 3:
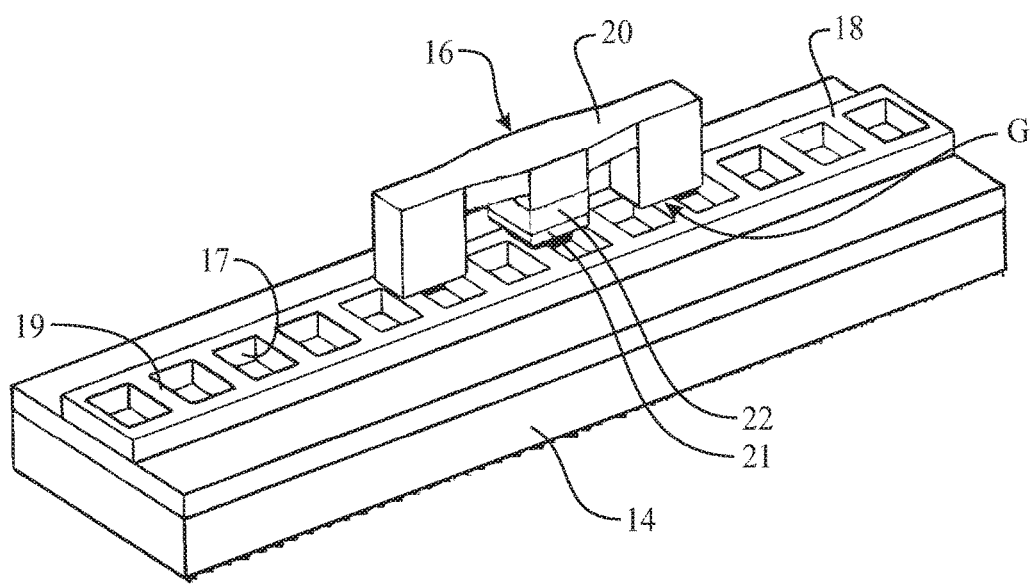
FIG. 3 is an adapted magnetic sensor of the load determining system according to FIGS. 1 and 2.

FIG. 3 is a schematic illustration of a sensor 16 formed as a differential Hall sensor with a back magnet that observes the spatial variation of the magnetic field due to the passage of the slotted magnetically permeable steel target ring 18. As a matter of course, the invention is not limited to target rings of slotted magnetically permeable steel rings but may be used with steel discs, gear teeth or magnetized target rings containing a multitude of precisely produced north and south poles on its surface. In the latter case, a differential Hall sensor without back magnet is also applicable.

As illustrated in FIG. 3, the magnetic field sensor 16 comprises a yoke 20 in the circumferential direction of the target ring 18 and covering multiple wavelengths of the target ring 18. A back magnet 22 is provided in a center part of the yoke 20 and generates magnetic field lines passing through one or more differential magnetic field sensors 21 arranged in at least one of two magnetic circuits passing through one leg of the yoke 20 and through the target ring. If an end portion of the yoke 20 facing the target ring 18 is arranged over the slot 17 of the target ring 18, the magnetic field lines are interrupted or at least strongly weakened, whereas they easily pass a gap G between the target ring 18 and the end faces of the yoke 20 and of the differential magnetic field sensor 21 in the center thereof if the latter are arranged over a partitioning finger of the target ring 18.

If the target ring 18 rotates underneath the magnetic field sensor 16, the magnetic field measured by the differential magnetic field sensor 21 is therefore oscillating with a frequency corresponding to the frequency of the passing slots 17 of the target ring 18.

It is important to note that the amplitude of this oscillation depends on the width of the gap G between the magnetic field sensor 16 and the target ring 18, more specifically between the end faces of the yoke 20 and of the differential magnetic field sensor and the partitioning fingers or bars 19 of the target ring 18. Essentially, the amplitude is an exponentially decreasing function of the width of this gap G. This width will also be called "distance" here and in the following.

Returning to FIG. 1, multiple magnetic field sensors 16 of the type illustrated in FIG. 3 are provided on the circumference of the target ring 18. In the actual embodiment, 4 magnetic field sensors 16 are provided at angles of 0°, 90°, 180° and 270° though only one of them is illustrated for the sake of simplicity. If the inner ring 12 of the bearing and hence the target ring 18 is tilted with respect to the outer ring 14, e.g. due to load acting on the bearing, the distances between the magnetic field sensors 16 and the target ring 18 will vary proportional to a sine of the tilt angle and will therefore obtain different values even in cases where the distances are identical in a configuration where the inner ring 12 and the outer ring 14 are perfectly aligned.

If, on the other hand, the inner ring 12 is axially displaced with regard to the outer ring 14, the distances observed by the distance magnetic field sensor 16 will change in an identical way.

It is therefore possible to measure axial displacements of the rings and tilt angles of the rings with high precision using the magnetic field sensors 16. The precision depends in particular on the decay constant of the exponential relationship between the distance and the amplitude of the sensor signals. A high value of the decay constant corresponds to a high precision and a low value of the decay constant corresponds to a low precision.

Sensor arrangements of the above described type are known from ABS systems in which the axial forces acting on the bearing, the axial displacement and the tilt angles are not of interest because the ABS system controls the longitudinal acceleration only, which is derived from the frequency of the sensor signals and not from the amplitude thereof. The inference of axial displacements or tilting is therefore diminished by using geometries with small exponential decay constants with values of around 0.5 mm$^{-1}$. The value of the exponential decay constant depends in particular on the wavelength of the slots 17 in the target ring 18. Long wavelengths correspond to a slow decay whereas short wavelengths correspond to a rapid decay. ABS sensors on the market usually employ wavelengths of around 6 mm to 8 mm.

The ABS sensor according to the invention employs smaller pitch wavelength w, in particular a wavelength w of less than 4 mm, preferably less than 3 mm so as to achieve values of the decay constant of 1.5 mm$^{-1}$ or more.

Besides of the magnetic field sensors 16, the outer ring is provided with 4 equally spaced strain sensors 24 bonded to the radially outer surface of the outer ring 14. Depending on the field of application, the strain sensors 24 may be protected by plastic covers and/or embedded in recesses or in a circumferential groove.

The strain sensors 24 are sensitive to local deformations of the outer surface of the outer ring, in particular to stretching deformations. However, temperature changes or thermal gradients in the bearing inevitably lead to local deformations resulting from the thermal expansion of the material and these contributions are not directly dependent on the force acting on the bearing.

Further, the signals of the strain sensors 24 do not differentiate between various deformation modes of the outer ring 14. For example, a shear deformation in a first axial direction which might be caused by forces generated in a cornering maneuver to the right would lead to the same sensor output pattern as the one obtained in a cornering maneuver to the right because the two corresponding deformation patterns are mirror-images to one another with regard to a radial center plane of the ring, such that the sensors 24 arranged in this plane do not see this difference.

The strain sensors 24 have therefore very limited capabilities of detecting absolute values of the forces and cannot detect information on the direction in which the forces act.

The load determining system is provided with a signal processing unit 26 receiving the signals from the strain sensors 24 and from the magnetic field sensors 16 and uses the combined sensor signals to determine the load acting on the bearing, wherein the different frequency components are treated separately as discussed in detail in WO2011/154016A1. The contents of the latter application relating to the processing of the signals of the strain sensors 24 are incorporated herewith by reference. In particular, the sensor signals are pre-processed by removing a drift of the sensor signals caused by friction heat prior to calculating the average.

The axial force components are mainly determined based on the signals received from the magnetic field sensors 16 as described below.

Figure 4:
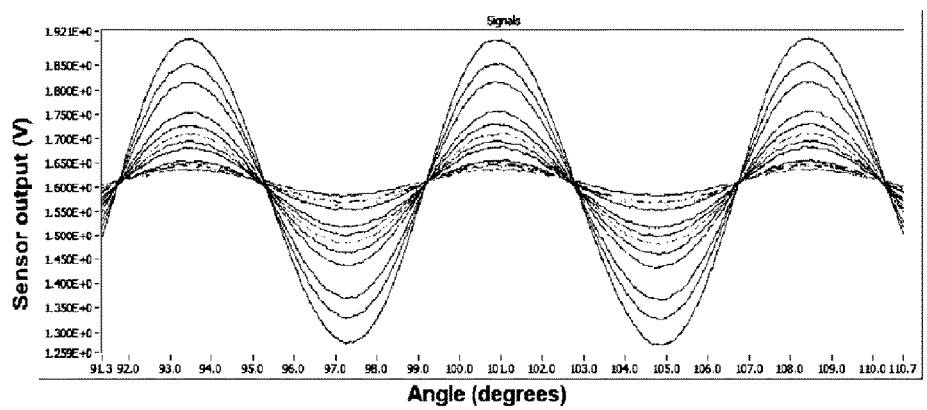
FIG. 4 is a schematic illustration of a sensor output of the sensor according to FIG. 3 for different widths of a gap.

FIG. 4 is a schematic illustration of a sensor output of the sensor according to FIG. 3 for different widths of a gap. As illustrated, the sensor output is roughly sinusoidal with a frequency corresponding to the frequency of the passing holes in the target ring. A high amplitude corresponds to a narrow gap G and a small amplitude to a wide gap G. Essentially, the differential Hall sensor's voltage variation from the passing target ring under it is a function of the distance or width of the gap G. The larger the distance, the smaller the signal becomes. FIG. 4 is a picture of the Hall sensor's voltage as function of angle for a steel target wheel with 48 slots 17 (7.5 degrees for a completed sine), using e.g. the IC-MZ chip (a commercially available 2.000 mm differential sensor) and a 0.4 T to 1 T back magnet. The neighboring traces depict the signal when the magnetic field sensor 16 is moved away in steps of 0.1 mm from the target wheel 18.

Figure 5:
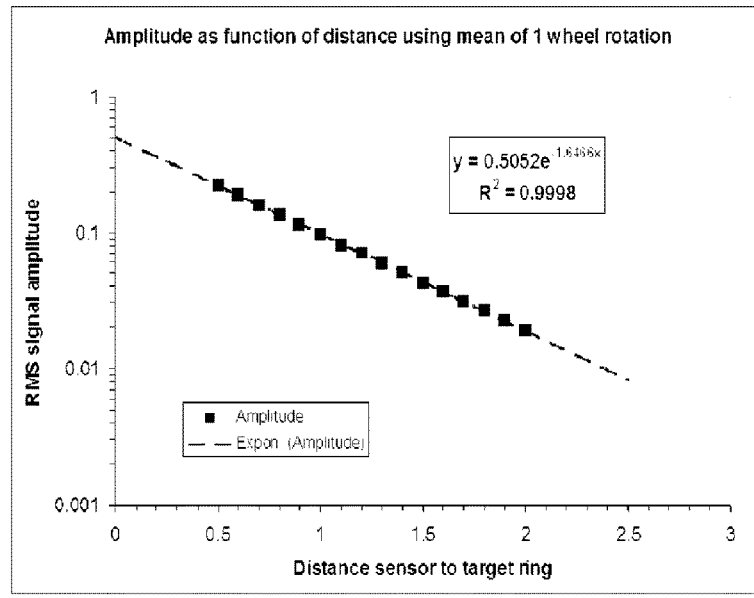
FIG. 5 is a graph illustrating the relation between the width of the gap between the sensor and the target ring and a signal amplitude of the sensor signal.

FIG. 5 is a graph illustrating the relation between the width of the gap G between the magnetic field sensor 16 and the target ring 18 and signal amplitude of the sensor signal in a logarithmic plot. The straight line in the logarithmic plot indicates an exponential relation, wherein the best fit is indicated as a dashed line, which corresponds to a decay factor of $-1.6466$ mm$^{-1}$ in the illustrated example. The exact value of the amplitude depends on the geometry of the magnet and yoke system and on the geometry of the teeth or slots 17 or bars 19 in the magnetically conducting target ring 18.

Figure 6:
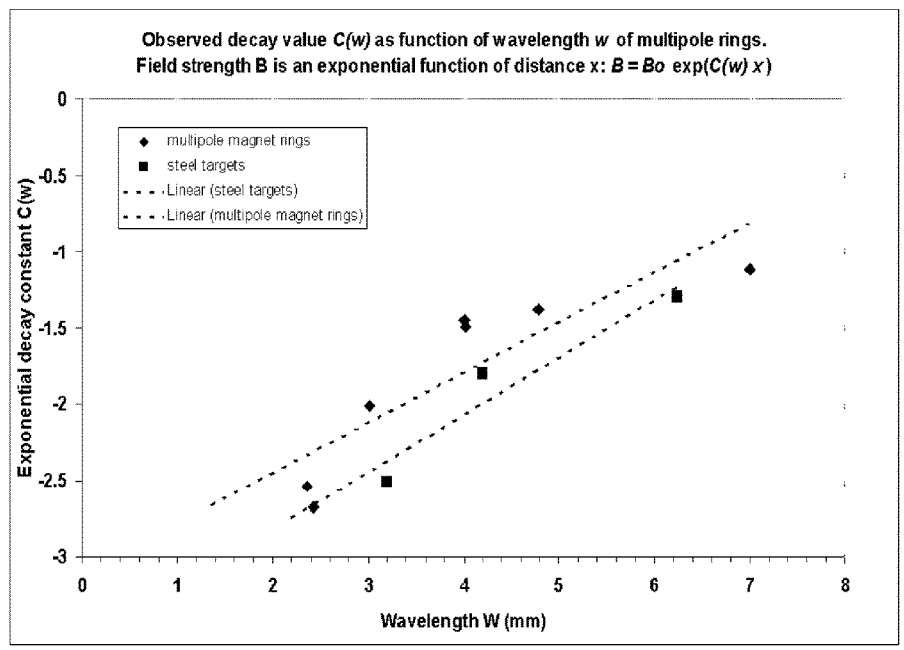
FIG. 6 is a graph illustrating a relation between a pitch wavelength/period of the target ring according to FIG. 2 and an exponential decay constant in the relation illustrated in FIG. 5.

FIG. 6 is a graph illustrating a relation between a pitch wavelength/period of the target ring according to FIG. 2 and an exponential decay constant in the relation illustrated in FIG. 5.

As already discussed above, the value of the exponent is particularly sensitive to the period length w of the target ring, and in minor way to the width of the ring and the radius of curvature. Generally, the exponent value is in the value range of $-0.7$ to $-3.5$, and the exponent goes more negative when the period length is decreased. Roughly speaking a period length of 7 mm results in an exponent of about $-1$ while a period length of 2.5 mm results in an exponent in the order of $-2.6$.

Thus, the period length and the exact geometric adaptations are used to tune the distance measurement to the size and application of the rolling element bearing 10. For a high resolution, short period lengths are favored but the penalty is that the magnetic field sensor 16 must have a precise location and distance when it is mounted.

In case of a magnetically permeable part such as a gear wheel or slotted disc, the patterns have tolerances in geometry and material composition, and run-out and flatness of the disc or wheel shaped target ring 18. Therefore, the sine waves like variations measured by the Hall sensor are not exact and vary from place to place. Similarly, in case of a magnetic ring, the magnets programmed into the material can vary from location to location. The result is that the signals observed vary slightly in phase and amplitude.

The effect of sine wave amplitude variation is minimized by averaging the amplitude over one rotation. The signal processing unit 26 therefore calculates this average. Doing an average over one rotation yields a very stable reading of the signal amplitude, and it is then possible or calibrate the amplitude as function of distance to the target ring 18, magnet ring or magnetically conducting (permeable) ferritic ring, gear or disc shaped part. The calibration is achieved by storing a suitable characteristic as illustrated in FIG. 4 in a storage unit of the signal processing unit 26.

The shape of the spatial differential magnetic field is also in general not sinusoidal. However by tuning the geometric shape of the gearwheel's teeth, or the geometry of the slots 17 and bars 19 in the sheet steel disc, it is possible to optimize the signal shape and to bring the total harmonic distortion down to practical values, well below 2% THD, so that precision estimates of the average amplitude is not seriously impaired when an average over a little less or more than 360 degrees is made in a practical automated measurement situation.

Using the example data set above, it is estimated how well the distance w of the rotating target ring 18 may be estimated. The first step is the measurement of the response B as function of distance Xactual. The standard deviation on B when rotating the disc is between 45 and 55 times smaller than the B itself. First, the distance is calculated from the average amplitude B from the inverse of the fit model:

$$\text{Distance X\_estimate} = -1/1.6466 * \ln(B/0.5052). \quad (1)$$

The margin in X_estimate with the B+/$-$3 times standard deviations is 8.5 micrometer.

For the cornering of a car in a strong curve of about 1 G centrifugal force the tire-road contact load in the lateral direction of the car is in the order of 5 kN. The bearing experiences a combined axial load of 5 kN and a corresponding cornering bearing moment of 1.6 kNm. If we can expect a tilt movement of 0.100 mm on the pitch radius of the ABS target ring, a differential movement of 0.200 mm can be measured. Having deduced that, it is possible with an adaptation of an ABS sensor as described above to do this with a resolution of 8.5 micrometer, and then the load resolution is in the order of 200 N.

The actual movement of the bearing can be substantial, as experiments have shown.

Figure 7:
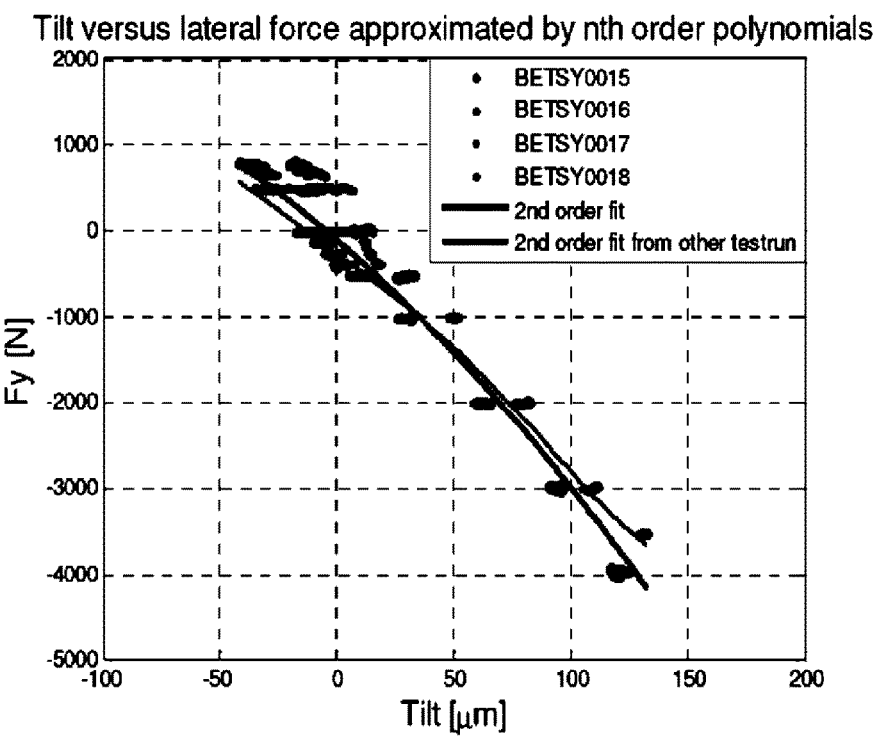
FIG. 7 illustrates a relation between a tilt of the target ring and a lateral force acting on the bearing unit.

FIG. 7 illustrates a relation between a tilt of the target ring and a lateral force acting on the bearing unit. FIG. 7 is a picture of the relative axial movement, measured with eddy current sensors to prove the tilt movement correctness, of the inner ring to the outer ring of the wheel hub unit used in BMW E60 test vehicles as function of cornering forces exerted on the wheel (lateral tire contact force Fy). Several tests delivered similar results.

The fit model applied to the tilt measurement yields an estimation of the lateral force from the tilt movement. The result are indicated as solid lines which may be stored as the characteristic in the signal processing unit.

Figure 8:
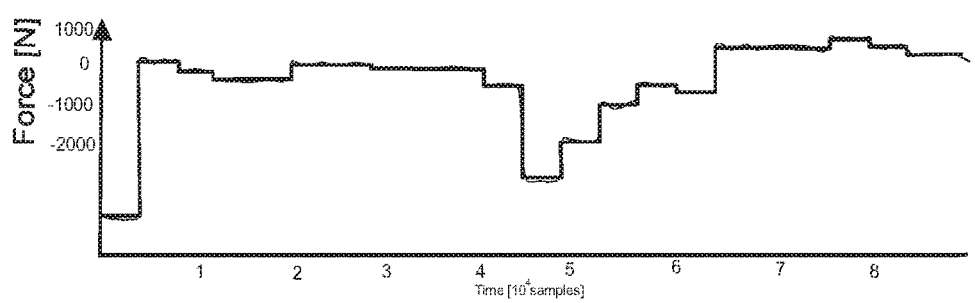
FIG. 8 illustrates a comparison between a lateral force acting on the bearing unit as estimated by the load determining system according to the invention and the lateral force which is actually applied.

FIG. 8 llustrates a comparison between a lateral force acting on the bearing unit as estimated by the load determining system according to the invention and the lateral force which is actually applied. The comparison shows that a reliable detection of axial forces is feasible using a sensor unit according to the invention.

Besides of detecting the load, the signal processing unit 26 may use the sensor information for other purposes, e.g. for monitoring and generating maintenance information. In particular, the signal processing unit 26 may be configured to determine an axial play of the rolling element bearing 10 and to generate a signal representative of a remaining bearing life based on the axial play.

The invention claimed is:

1. A load-determining system comprising:
    a sensorized rolling element bearing in a hub unit for wheels, the bearing including a first ring and a second ring as an inner ring and an outer ring, the system including:
    at least one magnetic field sensor attached to the first ring that interacts with a target ring attached to the second ring; and
    a signal processing unit configured to receive a magnetic field sensor output of the at least one magnetic field sensor, wherein the signal processing unit is configured to determine at least axial forces acting on the bearing based on an amplitude of the magnetic field sensor output;
    wherein a pitch wavelength of the target ring is 4 mm or less.

2. The load determining system according to claim 1, wherein
    the load determining system further comprises at least one deformation sensor adapted to be attached to an inner ring or to an outer ring of a bearing; wherein
    the signal processing unit is further configured to receive the deformation sensor output of the deformation sensor and to calculate a bearing load as a function of both a deformation sensor output and of the magnetic field sensor output.

3. The load determining system according to claim 1, wherein the target ring is arranged to face a sensing surface of the magnetic field sensor with an axial gap (G).

4. The load determining system according to claim 1, wherein the magnetic field sensor is formed as a differential Hall sensor.

5. The load determining system according to claim 1, wherein the target ring is formed as a slotted magnetically permeable steel ring.

6. The load determining system according to claim 1, wherein the target ring is formed having alternating magnetized regions.

7. The load determining system according to claim 1, wherein the signal processing unit is configured to calculate a bearing load as a function of the amplitude of the magnetic field sensor output.

8. The load determining system according to claim 7, wherein the signal processing unit is configured to calculate an average of the amplitude of the magnetic field sensor output over at least one revolution of the bearing and to determine the bearing load using the average of the amplitude of the magnetic field sensor output over at least one revolution of the bearing.

9. The load determining system according to claim 1, wherein the signal processing unit is configured to process sensor signals from the magnetic field sensor output by removing a drift of the sensor signals caused by friction heat prior to calculating an average.

10. The load-determining system according to claim 1, wherein the signal processing unit is configured to determine an axial play of the rolling element bearing and to generate a signal representative of a remaining bearing life based on the axial play.

11. A load determining system used in an ABS system of an automobile, the load determining system having:
    a sensorized rolling element bearing in a hub unit for wheels, the bearing including a first ring and a second ring as an inner ring and an outer ring, the system including:
    at least one magnetic field sensor attached to the first ring that interacts with a target ring attached to the second ring; and
    a signal processing unit configured to receive a magnetic field sensor output of the at least one magnetic field sensor, wherein the signal processing unit is configured to determine at least axial forces acting on the bearing based on an amplitude of the magnetic field sensor output,
    wherein a pitch wavelength of the target ring is 4 mm or less.

12. A method for determining a load acting on a sensorized rolling element bearing in a hub unit for wheels, the bearing including a first ring and a second ring as an inner ring and an outer ring, the method comprising steps of:
    receiving-a magnetic field sensor output of at least one magnetic field sensor attached to the first ring that interacts with a target ring attached to the second ring; and
    calculating at least axial forces acting on the bearing based on an amplitude of the magnetic field sensor output,
    wherein a pitch wavelength of the target ring is 4 mm or less.

* * * * *